United States Patent Office 3,637,859
Patented Jan. 25, 1972

3,637,859
FRAGRANCE MATERIALS AND PROCESSES
Jack H. Blumenthal, Oakhurst, N.J., assignor to International Flavors & Fragrances Inc., New York, N.Y.
No Drawing. Filed Aug. 14, 1968, Ser. No. 752,465
Int. Cl. C07c 47/20
U.S. Cl. 260—601     1 Claim

ABSTRACT OF THE DISCLOSURE

The novel aldehyde 3,7-dimethyl-3-ethyl-6-octenal, perfume and fragrance compositions containing such aldehyde, and processes for producing same.

BACKGROUND OF THE INVENTION

There is a continuing search for materials having desirable fragrance properties. Such materials are sought either to replace costly natural materials or to provide new fragrances or perfume types which have not heretofore been available. Especially desirable qualities for substances having interesting fragrances are stability in a wide variety of perfumed articles and perfume compositions, ease of manufacture, and intensity of aroma.

THE INVENTION

The invention comprises the novel products as well as the novel processes and steps of processes according to which such products are manufactured, the specific embodiments of which are described hereinafter by way of example and in accordance with which it is now preferred to practice the invention.

Briefly, the present invention provides a novel 3-disubstituted aldehyde, 3,7-dimethyl-3-ethyl-6-octenal having the formula

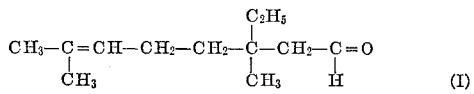

(I)

and perfume and fragrance-modifying materials containing such aldehyde. The novel aldehyde is obtained by selective hydrogenation of a vinyl material, as more fully described hereinafter.

It has been found that the aldehyde of this invention possesses a sweet, fresh coriander aroma of good intensity and persistence. This fragrance quality particularly adapts the novel aldehyde for incorporation into perfume compositions and fragrance-modifying compositions having a desirable sweet coriander-like aroma. It will be appreciated by those skilled in the art from the present disclosure that the fragrance character of the finished perfume compositions can be tailored to specific uses, as more fully described hereinafter.

Aldehyde I has a specific gravity at 20° C. of 0.8699 and an $n_D^{20}$ of 1.4572. The molecular weight is indicated as 182.

A number of different starting materials can be utilized to produce the novel aldehyde. In the preferred method, the starting material, 3,7-dimethyl-3-vinyl-6-octenal is obtained by thermal isomerization of geranyl vinyl ether as described by Julia et al., Bull. Soc. Chim., France (1962):1947–52. The geranyl vinyl ether is conveniently prepared by transvinylation of geraniol-nerol with ethyl vinyl ether using mercuric acetate as a catalyst. The novel aldehyde is obtained by hydrogenating the 3,7-dimethyl-3-vinyl-6-octenal in the presence of a catalyst.

The hydrogenation is carried out preferably under superatmospheric pressures at temperatures in the range of from 20–100° C. for from 1–5 hours. It is preferred to use one molecular proportion of hydrogen per mol of the 3-vinyl material to minimize formation of octanal. The starting 3-vinyl material is preferably relatively pure to minimize the production of by-products which are difficult to separate from the desirable aldehyde.

The catalyst is preferably a hydrogenation catalyst which will selectively hydrogenate a vinyl double bond. The previous metal catalysts such as platinum, Raney nickel, palladium, and rhodium are suitable, and they are conveniently deposited on an inert carrier such as carbon, calcium carbonate and the like. A preferred catalyst is palladium on calcium carbonate.

After the hydrogenation is complete, the reaction mixture is filtered to remove hydrogenation catalyst and can then be washed several times to purify it. The novel aldehyde is recovered from the reaction mixture by suitable techniques such as distillation, extraction, chromatographic techniques and the like. It has been found that fractional distillation under vacuum is a desirable way to obtain the pure aldehyde from the reaction mixture.

Purified 3,7-dimethyl-3-ethyl-6-octenal (herein sometimes called "Aldehye I" or simply "aldehyde") is an olfactory agent and can be incorporated into a wide variety of compositions which will be enhanced by its fresh, sweet coriander fragrance note. The aldehyde can be added to perfume compositions in its pure form or it can be added to mixtures of materials in fragrance-imparting compositions to provide a desired fragrance character to a finished perfume material. The perfume and fragrance compositions obtained according to this invention are suitable in a wide variety of perfumed articles and can also be used to enhance, modify or reinforce natural fragrance materials. It will thus be appreciated that the aldehyde of this invention is useful as an olfactory agent and fragrance.

The term "perfume composition" is used herein to mean a mixture of compounds, including, for example, natural oils, synthetic oils, alcohols aldehydes, ketones, esters, lactones, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh-smelling materials. Such perfume compositions or the novel materials of this invention can be used in conjunction with carriers, vehicles, solvents, dispersants, emulsifiers, surface-active agents, aerosol propellants, and the like.

In perfume compositions the individual components contribute their particular olfactory characteristics, but the overall effect of the perfume composition will be the sum of the effect of each ingredient. Thus, the aldehyde of this invention can be used to alter the aroma characteristics of a perfume composition, for example, by highlighting or moderating the olfactory reaction contributed by another ingredient of the composition.

The amount of aldehyde of this invention which will be effective in perfume compositions depends on many factors, including the other ingredients, their amounts and the effects which are desired. It has been found that perfume compositions containing as little as 3.0% by weight of mixtures or compounds of this invention, or even less can be used to impart a fresh coriander odor to soaps, cosmetics and other products. The amount employed will depend on considerations of cost, nature of the end product, the effect desired in the finished product, and the particular fragrance sought.

The aldehyde disclosed herein can be used alone, in a fragrance-modifying composition, or in a perfume composition as an olfactory component in detergents and soaps; space deodorants; perfumes; colognes; bath preparations such as bath oil, bath salts; hair preparations such as lacquers, brilliantines, pomades, and shampoos; cosmetic preparations such as creams, deodorants, hand lotions, sun screens; powders such as talcs, dusting powders, face powder and the like. When the aldehyde of this invention is used in perfumed articles such as the foregoing, it can be used in amounts of 0.1% or lower. Generally it is preferred not to use more than about 1.0% in the finished perfumed article, since the use of too much will tend to unbalance the total aroma and will needlessly raise the cost of the article.

The following examples serve to illustrate embodiments of the invention as it is now preferred to practice it. It will be understood that these examples are illustrative and the invention is to be considered restricted thereto only as indicated in the appended claim.

EXAMPLE I

The following ingredients are introduced into an autoclave.

| Ingredient: | Amount |
|---|---|
| 3,7-dimethyl-3-vinyl-6-octenal (86.3% pure) (⅓ mol), g. | 60.0 |
| Isopropyl alcohol, ml. | 100.0 |
| Palladium (5%) on calcium carbonate catalyst, g. | 0.6 |

The autoclave is purged and pressure-checked and the temperature is brought to 35° C. Hydrogen is admitted with agitation over a period of one hour until the theoretical amount has been introduced into the autoclave. The 136 g. of reaction mixture so obtained is then distilled at 96–108° C. at 3.0–3.3 mm. Hg to obtain the novel aldehyde.

The pure 3,7-dimethyl-3-ethyl-6-octenal has an $n_D^{20}$ of 1.4572. Its molecular weight is 182. The aldehyde has a fresh, sweet coriander oil fragrance.

EXAMPLE II

The following mixture is introduced into an autoclave.

| Ingredient: | Amount |
|---|---|
| 3,7-dimethyl-3-vinyl-6-octenal (2.475 mol), g. | 445.5 |
| Isopropyl alcohol, ml. | 900.0 |
| Palladium (5%) on calcium carbonate catalyst, g. | 1.5 |

The mixture is introduced into an autoclave and the autoclave is then purged and pressure-checked. The ingredients are brought to 35° C. and the theoretical amount of hydrogen is introduced over a two hour and ten minute period. During this time the temperature is controlled at 32–38° C.

The 1162 g. of reaction product is filtered, and the alcohol is recovered by evaporation. The reaction mixture is then distilled as in Example I to provide the novel aldehyde as described.

EXAMPLE III

The following composition is prepared.

| Ingredient: | Amount (grams) |
|---|---|
| Cassia absolute | 60 |
| Methyl ionone | 60 |
| Jasmin extra | 80 |
| Neroli oil, bigarade | 60 |
| Patchouli oil | 60 |
| Vanillin | 60 |
| Violet perfume base | 60 |
| 3,7-dimethyl-3-ethyl-6-octenal | 15 |
| Lemon oil | 80 |
| Rose geranium oil | 120 |
| Lavender oil, French | 120 |
| Sweet orange oil | 80 |
| Musk extract, 3% | 50 |
| Civet extract, 3% | 50 |
| | 955 |

The original fragrance composition was designed with 60 parts of coriander oil in a total of 1,000 parts, a quantity sufficient for recognition of this distinctive essential oil. The 60 parts were replaced with a lesser quantity (15 parts) of 3,7-dimethyl-3-ethyl-6-octenal and it was found that the final blend appeared to have the same fresh coriander note and the same all-over odor balance.

The product of Example I is compared with its adjacent homolog 3-ethyl-7-methyl-6-octenal which is prepared by hydrogenation of the corresponding vinyl material. The adjacent homolog has a crude earthy, weedy-moist hay odor which is totally different in character from the sweet fresh coriander quality of the novel aldehyde according to the present invention.

EXAMPLE IV.—SYNTHETIC CORIANDER OIL

| | A | B |
|---|---|---|
| Gamma terpinene | 10 | 10 |
| n-Decanal | 3 | 3 |
| 3,7-dimethyl-3-ethyl-6-octenal | 20 | |
| Linalool | 67 | 67 |
| Total | 100 | 80 |

One percent of the above compositions A and B were separately incorporated in a commercial unperfumed toilet soap base and compared with a third product containing natural coriander oil. The milled and stamped bars were then judged for aroma and it was found that the composition of experiment A afforded a close resemblance to the essential oil of coriander, whereas the composition of experiment B did not have this aroma.

The similar addition of 0.2% of 3,7-dimethyl-3-ethyl-6-octenal alone, without benefit of blending, also provides a coriander-like aroma in finished soap bars. It will be appreciated from the present description that the novel aldehyde can be included in other perfume compositions and in other perfumed articles such as detergents, shampoos, powders, space deodorants, sachets, paper goods, and the like.

What is claimed is:
1. 3,7-dimethyl-3-ethyl-6-octenal.

References Cited

UNITED STATES PATENTS 3,463,818   8/1969   Blumenthal _____ 260—601

OTHER REFERENCES

Julia et al., Bull. Soc. Chim., 1962, pp. 1947–1952.
Naves, Bull. Soc. Chim., 1952, pp. 519–520.

LEON ZITVER, Primary Examiner

R. H. LILES, Assistant Examiner

U.S. Cl. X.R.

424—333